(12) United States Patent
Arunachalam et al.

(10) Patent No.: US 11,572,965 B2
(45) Date of Patent: Feb. 7, 2023

(54) AUTOMATED DISCONNECTING OF SAFETY VALVES IN A GAS DISTRIBUTION SYSTEM

(71) Applicant: HONEYWELL INTERNATIONAL INC., Morris Plains, NJ (US)

(72) Inventors: Soundari Arunachalam, Karnataka (IN); Suresh Kumar Palle, Karnataka (IN); Murali Krishna Bezawada, Telangana (IN); Kishore Naidu Lachubugatha, Telangana (IN); Kevin Graebel, Plymouth, MN (US); Max Gutberlet, Hesse (DE)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 463 days.

(21) Appl. No.: 16/665,884

(22) Filed: Oct. 28, 2019

(65) Prior Publication Data
US 2020/0182376 A1 Jun. 11, 2020

Related U.S. Application Data

(60) Provisional application No. 62/777,948, filed on Dec. 11, 2018.

(51) Int. Cl.
*F16K 37/00* (2006.01)
*H04W 84/18* (2009.01)
(Continued)

(52) U.S. Cl.
CPC ........ *F16K 37/0041* (2013.01); *F16K 37/005* (2013.01); *F16K 37/0083* (2013.01);
(Continued)

(58) Field of Classification Search
CPC ............... F16K 37/005; F16K 37/0091; F16K 37/0041; H04W 84/18; Y10T 137/8326; G06N 20/00
(Continued)

(56) References Cited

U.S. PATENT DOCUMENTS 5,460,196 A * 10/1995 Yonnet ............... G05D 16/2095
137/12
8,930,150 B2 * 1/2015 Israeli ................. G01M 3/2815
702/51

(Continued)

*Primary Examiner* — William M McCalister
(74) *Attorney, Agent, or Firm* — John Maldjian; Stevens & Lee PC

(57) ABSTRACT

A system includes a gas distribution network having sub-networks including a first sub-network, each sub-network including a pipe section having a gas safety device coupled to a gas safety valve. The gas safety device includes a pressure sensor, a shut off controller configured to shut off the gas safety valve, a computing device, and a communications module. A server is communicably coupled to the communications modules of the gas safety devices for that implements artificial intelligence (AI) which based on a current threat condition to the gas distribution network determines affected sub-networks. The server is for sending of a valve closing instruction signal to the gas safety device in the first sub-network during the current threat condition when the current threat condition is determined to affect the first sub-network. Responsive to the valve closing instruction signal, the gas safety device shuts off the gas safety valve in the first sub-network.

16 Claims, 3 Drawing Sheets

(51) Int. Cl.
*G06N 20/00* (2019.01)
*F17D 1/04* (2006.01)
*G05D 11/13* (2006.01)

(52) U.S. Cl.
CPC ............... *F17D 1/04* (2013.01); *G06N 20/00* (2019.01); *H04W 84/18* (2013.01); *G05D 11/137* (2013.01)

(58) Field of Classification Search
USPC ........................................................ 137/557
See application file for complete search history.

(56) References Cited

U.S. PATENT DOCUMENTS

| | | | | |
|---|---|---|---|---|
| 9,366,595 | B2* | 6/2016 | Bourgeois | F17D 3/18 |
| 9,851,103 | B2* | 12/2017 | Kucera | G05D 16/2033 |
| 10,386,262 | B2* | 8/2019 | Chaudhary | G01M 3/2815 |
| 2008/0167825 | A1* | 7/2008 | Tarabzouni | G06F 16/29 |
| | | | | 702/36 |
| 2009/0007968 | A1* | 1/2009 | Knecht | G01M 3/2807 |
| | | | | 137/15.11 |
| 2011/0247705 | A1* | 10/2011 | Humphrey | G01F 23/0061 |
| | | | | 137/455 |
| 2013/0299001 | A1* | 11/2013 | Gillette | H02J 13/00032 |
| | | | | 137/2 |
| 2013/0306157 | A1* | 11/2013 | Aylon | E03B 7/07 |
| | | | | 137/1 |
| 2014/0096837 | A1* | 4/2014 | Belady | F16L 55/0333 |
| | | | | 137/14 |
| 2014/0130878 | A1* | 5/2014 | Marinez | F16K 37/005 |
| | | | | 137/2 |
| 2014/0305513 | A1* | 10/2014 | McDowell | F17D 5/06 |
| | | | | 137/15.11 |
| 2015/0308919 | A1* | 10/2015 | Zhang | G01M 3/243 |
| | | | | 702/51 |
| 2015/0362090 | A1* | 12/2015 | Anderson | F16K 37/0041 |
| | | | | 137/551 |
| 2016/0072891 | A1* | 3/2016 | Joshi | G06Q 30/0641 |
| | | | | 370/254 |
| 2016/0163177 | A1* | 6/2016 | Klicpera | G08B 21/18 |
| | | | | 137/59 |
| 2017/0075365 | A1* | 3/2017 | Tarantino | G05B 15/02 |

* cited by examiner

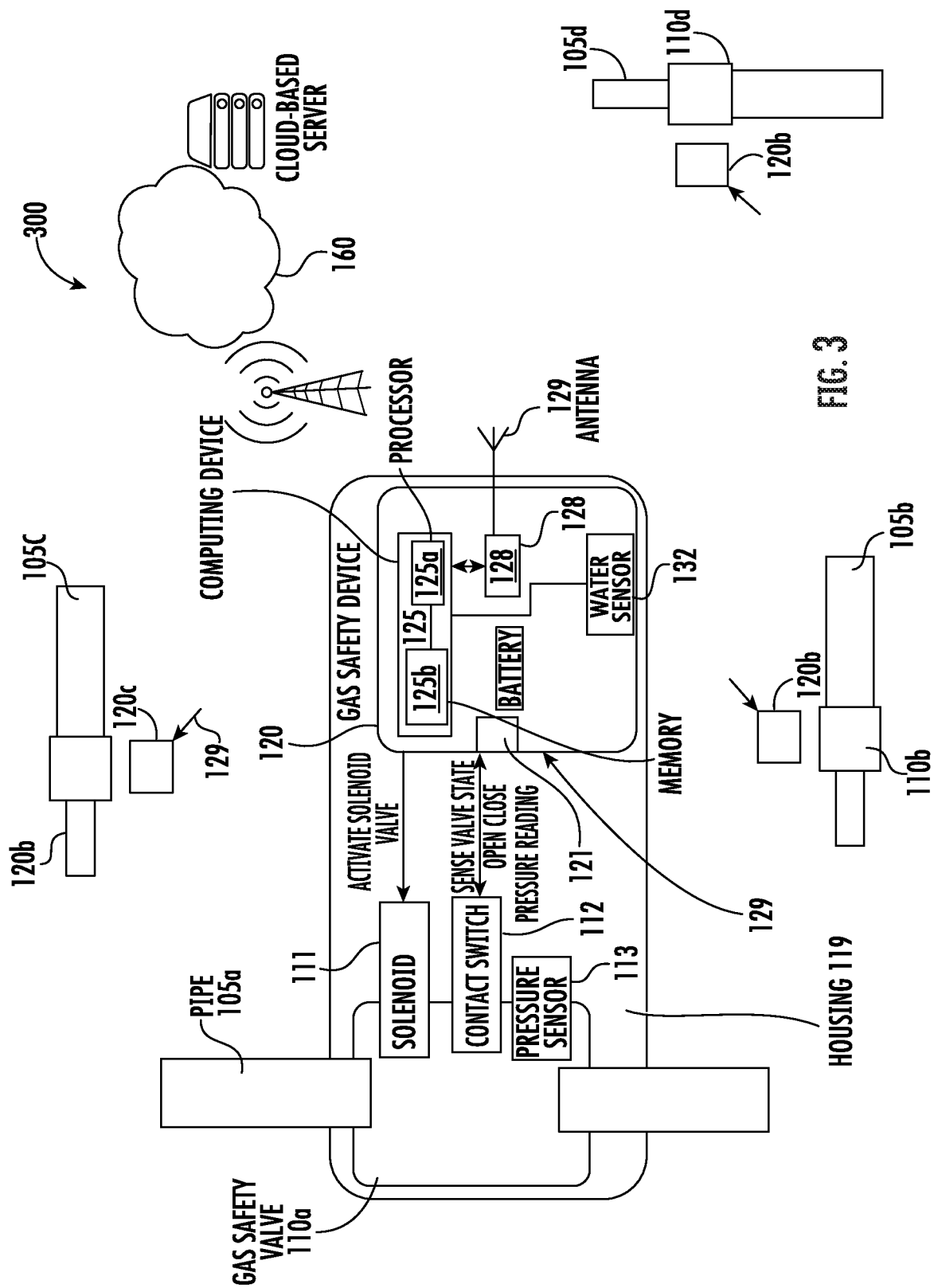

ated local or remote disconnecting of safety valves in a gas distribution management system responsive to sensing a current threatening condition, shown with a cloud-based server, according to an example embodiment.

FIG. 2 is a depiction of a disclosed gas safety system for the automated local or remote disconnecting of safety valves in a gas distribution management system responsive to sensing a current threatening condition, shown with the server in a gas distribution utility office of the gas distribution network, according to an example embodiment.

FIG. 3 is a depiction of a disclosed gas safety system for the automated local or remote disconnecting of safety valves in a gas distribution management system responsive to sensing a current threatening condition, showing a plurality of sub-networks shown and with a cloud-based server, according to an example embodiment.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

FIG. 1 is a depiction of a disclosed gas safety system 100 for the automated local or remote disconnecting of safety valves responsive to sensing a current threatening condition, for simplicity shown with a single gas safety valve 110 that is attached to a pipe 105 within a gas distribution network. There is also a gas safety device 120. The gas safety valve 110 and gas safety device 120 are both within an outer housing (or body) 119. The gas safety valve 100 comprises a solenoid 111, a contact switch 112, and a pressure sensor 113. The solenoid 111 releases the gas pressure and the gas safety valve 110 slams shut as a result of a pressure loss. The purpose of the contact switch 112 is to ensure that the gas safety valve 110 has been driven closed as a result of the solenoid 111 opening.

The gas safety device 120 includes a communication module shown comprising a transceiver 128 coupled to an antenna 129, where the antenna 129 extends outside of the housing 119. The gas safety device also includes a shut off controller 121 operable to communicate with the contact switch 112 to initiate shutting off the safety valve 110 responsive to a current threatening condition in the sub-network. The threatening condition can comprise an internal stimuli or an external stimuli. For example, an external condition can comprise a water level reading from the water level sensor 132 shown which senses when water is present in the housing 119.

The shut off controller module 121 is configured to shut off the gas safety valve 110 responsive to a valve closing signal received from a server shown in FIG. 1 as a cloud-based server 160, or responsive to a sensor reading received from a sensor such as a pressure sensor 113, a temperature

AUTOMATED DISCONNECTING OF SAFETY VALVES IN A GAS DISTRIBUTION SYSTEM

CROSS REFERENCE TO RELATED APPLICATIONS

This application claims the benefit of Provisional Application Ser. No. 62/777,948 entitled "SYSTEM FOR AUTOMATED DISCONNECTING OF SAFETY VALVES IN A HYDROCARBON GAS DISTRIBUTION SYSTEM," filed Dec. 11, 2018, which is herein incorporated by reference in its entirety.

FIELD

Disclosed embodiments relate to safety valves associated with a gas distribution system, such as for distributing natural gas.

BACKGROUND

Safety issues in a hydrocarbon gas distribution network (or a gas grid) can become catastrophic if not handled in advance. Floods, hurricanes, fire and other drastic changes in environmental conditions, the sudden and unexpected increase or decrease in pressure in a gas pipeline, a sudden increase or decrease in the temperature in a gas pipeline, or the manual tampering of safety valves can each result in dangerous conditions, such as a gas line explosion. The dangerous conditions are conventionally addressed by physically (manually) closing specific safety valves installed in the gas line of the gas distribution network.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize first locating the safety valves in a gas distribution network and conventionally manually shutting them down based on a current threat is time consuming and imprecise, because the gas utility that manages the gas distribution network may have to scan a very large area to respond to a localized incident that affects only a very small area of the gas distribution network. Disclosed aspects recognize the need for a full understanding of the gas network's configuration as well as current geographical and environmental conditions to enable determining which sub-network of the gas network to shutdown with safety valves upon the detection of a current threatening condition.

Thus, a plurality of different scenarios of threatening conditions impacting the gas network can be automatically managed to respond essentially instantaneously. A server with a disclosed artificial intelligence (AI) tool receives current threat data regarding the gas network including from disclosed gas safety devices that are each coupled to control a gas safety valve, and in response identifies one or more impacted sub-networks, and can then determine the specific safety valve closures to implement the needed partial gas network shutdown, which can optionally include the order of the safety valve closures. Benefits of disclosed aspects include the avoidance of health and safety execute (HSE) issues and also penalties such as fines or possible imprisonment.

Figure 1:
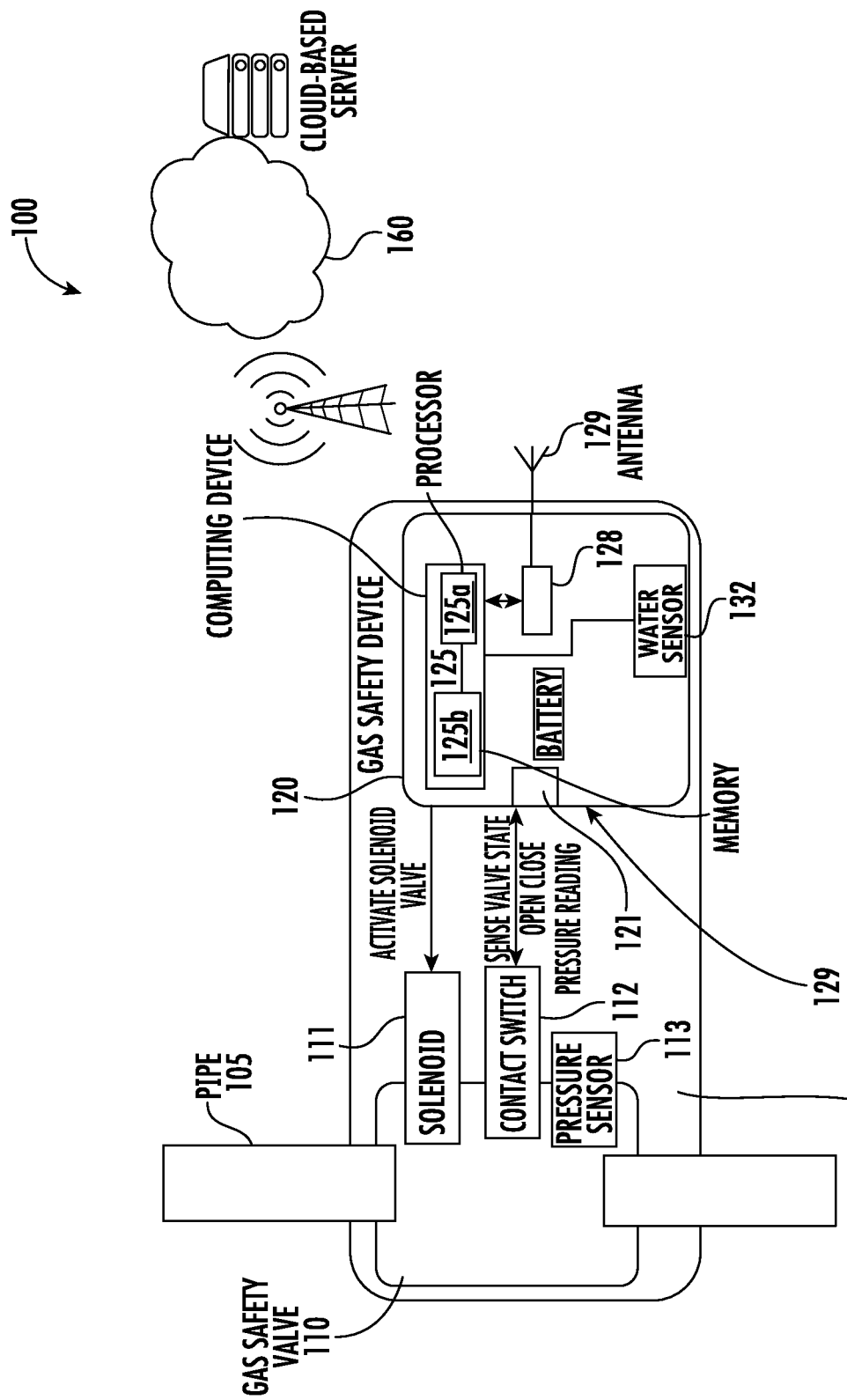
FIG. 1 is a depiction of a disclosed case safety system for the automated local or remote disconnecting of safety valves in a gas distribution management system responsive to sensing a current threatening condition, shown with a cloud-based server, according to an example embodiment.

sensor, a tamper detection sensor, or the water level sensor 132. For example, the shut off controller module 121 can be designed to prompt the closing of the gas safety valve 110 when the water level sensor 132 detects water inside the housing 119. Besides the water level sensor 132 and pressure sensor 113, there can be a temperature sensor, or a tamper detection sensor.

The stimuli can be external stimuli in the form of a notification (e.g., weather related condition, such as a pending hurricane or typhoon) received from the cloud-based server 160, a problem with the gas pressure from the pressure switch 113, a problem with the gas temperature the safety valve 110 (the valve body itself generally does not have a temperature sensor, but it does have a plug that melts above a certain temperature and releases the pressure in the valve body, triggering a valve closure), or the triggering of a tamper detection alarm from the safety valve 110. There is generally not a separate tamper detection sensor. However, if the safety valve 110 is moved into a position other than a position it is supposed to be, there is generally an alert generated by the gas safety device 120.

The safety device 120 includes a computing device 125 comprising a processor 125*a* (such as a microprocessor) and a memory 125*b* that controls the shut off controller 121 to prompt the contact switch 112 and solenoid 111 to control the open/close state of the safety valve 110. There is also a communications module comprising the transceiver 128 coupled to an antenna 129 operable to inform the cloud-based server 160 regarding the configuration of the safety valves 110 in the gas network as per the latest gas safety valve status. The gas safety device 120 is shown including a battery 127.

In operation the gas safety device 120 using a signal from the contact switch 112 will identify if the safety valve 110 is opened, closed, or in some problematic intermediate state. As noted above the gas safety device 120 can be triggered by a server such as the cloud-based server 160 to initiate signaling to shut off one or more safety valves including safety valve 110. The server such as cloud-based server 160 can employ AI to determine when to shut off and which sub-network to shut off based on at least one current condition communicated to it by the safety device 120.

As known in the art, AI refers to computer systems that automatically perform tasks typically performed by humans. These tasks can include interpreting a physical environment or data it is provided, or using reason or logic to solve problems.

As noted above the cloud-based server 160 can communicate with a weather prediction system and initiate shut off for safety valves in affected areas of the gas distribution network only, such as when a hurricane is forecast to arrive. The cloud-based server 160 can identify affected areas based on geo-informatics information including slopes and rises. The cloud-based server 160 can generate user shut off patterns based on alarm location used to mark the affected areas. The cloud-based server 160 can also communicate with a gas meter data management system to obtain information about pressure, volume and temperature conditions that can trigger potential failures of the safety valve 110.

Figure 2:
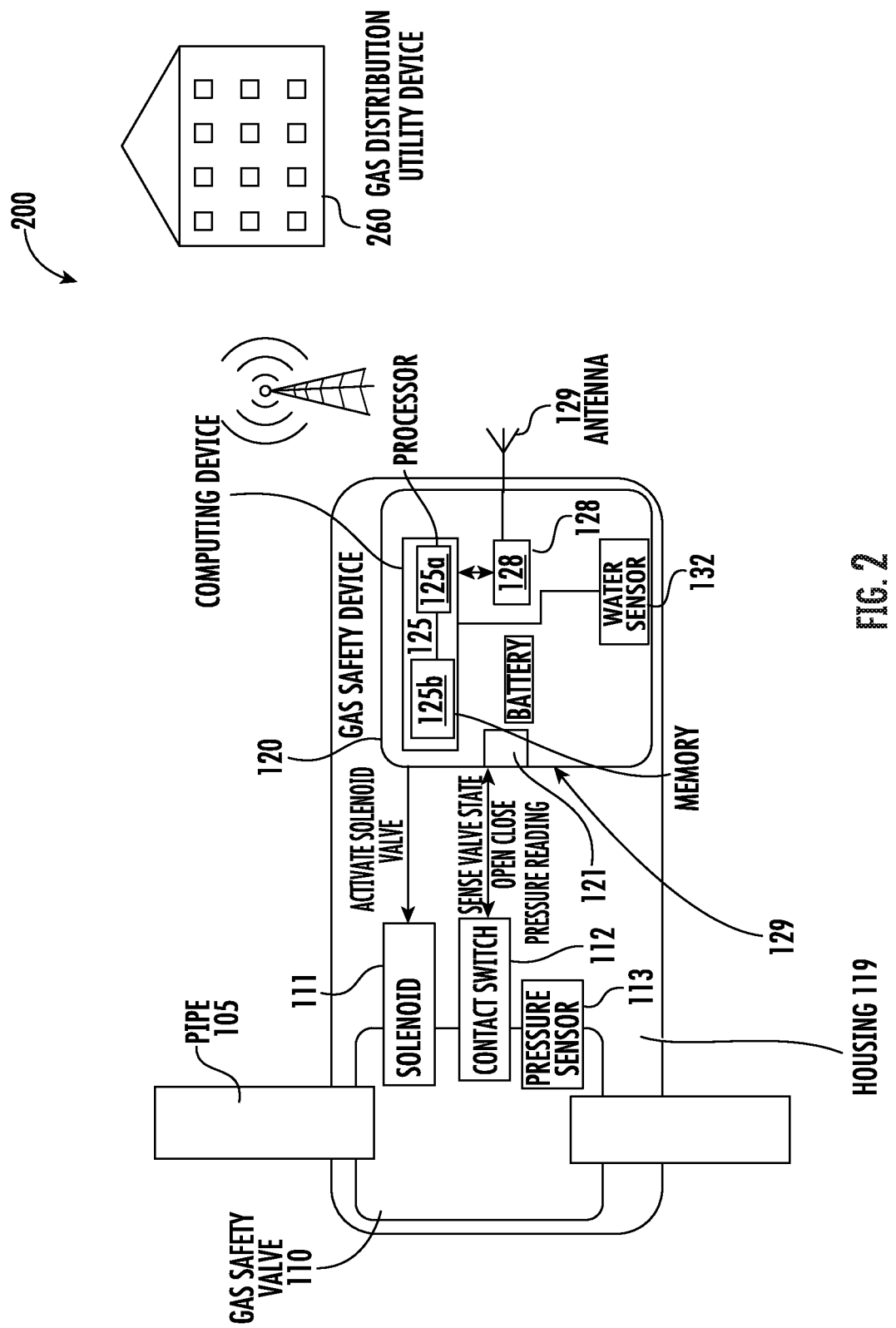

FIG. 2 is a depiction of a disclosed gas safety system 200 for the automated local or remote disconnecting of safety valves in a gas distribution management system responsive to sensing a current threatening condition, shown with the server 260 in a gas distribution utility office 280 of the gas distribution network, according to an example embodiment.

The server can also generally be installed anywhere in the system as long as it has communication connectivity to the gas safety devices 120.

FIG. 3 is a depiction of a disclosed gas safety system 300 for the automated local or remote disconnecting of safety valves in a gas distribution management system responsive to sensing a current threatening condition, showing a plurality of sub-networks shown with a cloud-based server 160, according to an example embodiment. There are four sub-networks shown comprising pipe section 105*a* with gas safety valve 110*a* and gas safety device 120*a*, pipe section 105*b* with gas safety valve 110*b* and gas safety device 120*b*, pipe section 105*c* with gas safety valve 110*c* and gas safety device 120*c*, and pipe section 105*d* with gas safety valve 110*d* and gas safety device 120*d*. When the server 160 determines the current threat condition affects say all the sub-networks, but most urgently the sub-network associated with pipe section 105*c*, the valve closing instruction signal from the server 160 which may be sent as signals to respective communication modules connected to the gas safety valves can be sent as a sequence of signals for shutting off the gas safety valves in the respective sub-networks. In another scenario, the server 160 can determine the current threat condition only affects the sub-network associate pipe section 105*b*. In that case the valve closing instruction signal from server 160 is configured to only cause the safety valve 110*b* to close.

In another disclosed aspect, when the current threat condition is determined to only affect specific sub-networks, the valve closing instruction signal is also coupled to the gas safety device in only those sub-networks experiencing a current threat condition. To implement selective coupling the instruction signal can be sent only to the communication modules connected to the affected gas safety valves. In this disclosed aspect, the valve closing instruction signal can include a sequence for shutting off the gas safety valves in the sub-networks experiencing a current threat condition, with the sequence being based on some logical basis. For example, if the threat condition is a flood alert, based on geo-information lower altitude sub-networks may be closed first before higher altitude sub-networks.

The server may communicate with a weather prediction system to enable initiating closure of the gas safety valve in bad weather affected areas only. The server may also identify affected areas based on geo-informatics information including slopes and rises. User shut off patterns based on alarm location can also be used to mark the affected areas.

In another disclosed aspect, the AI implement by the server can further comprise at least one of a flood AI module or a valve failure AI module. Regarding the flood AI module, a flood AI model can takes inputs from a variety of information sources. For example, the history of rainfall in the area, water sources in the area, geo-information system with altitude information, previous flood affected routes, the location of the gas safety valves, a history of the gas safety valves shut off during floods, or from a flood information system or a flood prediction system.

The flood AI module can derive a flood risk score of delivery points based on the area/amount of rainfall. This model can utilize information from a weather prediction system and predict the list of gas safety valves to shut off, when to initiate the shut off, and the order of gas valve shut off. The flood AI model is a self-learning model where it can also accommodate the valves that were additionally manually closed by an operator/technician in the case of a flood event.

Regarding a disclosed valve failure AI model, a valve failure AI model can utilize inputs from a variety of sources. For example, a history of gas pressure, volume, and/or temperature changes that led to a valve failure, patterns of atmospheric condition changes that led to a valve failure over a period of time, patterns of gas quality changes that led to a valve failure, valve maintenance records. The valve failure AI model can determine a valve failure Risk score for the respective gas safety valves.

The valve failure AI model can utilize information received from meter data management systems, weather systems and gas chromatography (GC) to track gas quality changes, systems and predict the approximate time of gas safety valve failure. The valve failure AI model can generate alarms in the cloud system if the time of failure falls within a threshold initiate remote shut off in case of an urgency.

The shut off controller module 121 as described above is operable to initiate shutting off the gas safety valves based on internal or external stimuli. The stimuli can comprise a water level sensor reading, gas pressure from the pressure sensor, gas temperature from the gas safety valve, or a tamper detection alarm from the gas safety valve. The shut off controller module 121 can also inform the server to reflect the configured gas safety valves as per the latest status for the gas safety valves.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The invention claimed is:

1. A system, comprising:
 a gas distribution network that includes a plurality of sub-networks including a first sub-network, wherein the plurality of sub-networks each include a pipe section having at least one gas safety device coupled to a gas safety valve, and wherein the gas safety device includes a pressure sensor and at least one additional sensor, a shut off controller module configured to shut off the gas safety valve, a computing device comprising a processor and a memory, and a communications module including a transceiver, and
 a server communicably coupled to the communications modules of the gas safety devices for implementing artificial intelligence (AI) that based on at least one current threat condition to the gas distribution network determines affected ones of the plurality of sub-networks, the server further implements a valve failure AI module, wherein
 the valve failure AI module determines a valve failure Risk score for a plurality of gas safety valves of the gas distribution network using inputs from a variety of sources including at least one of:
 a history of gas pressure, volume, and/or temperature, patterns of atmospheric condition, patterns of gas quality changes, and valve maintenance records;
 the server for initiating a sending of a valve closing instruction signal to the gas safety device in the first sub-network during the current threat condition when the current threat condition is determined to affect the first sub-network, and
 responsive to the valve closing instruction signal, the shut off controller module shutting off the gas safety valve in the first sub-network.

2. The system of claim 1, wherein the server is cloud located, and wherein the communications module further comprises an antenna for wirelessly communicating to the server.

3. The system of claim 1, wherein the server is in a gas distribution utility office of the gas distribution network.

4. The system of claim 1, further comprising a housing, wherein the gas safety valve and the gas safety device are both within the housing.

5. The system of claim 1, wherein the additional sensor comprises a temperature sensor, a tamper detection sensor, or a water level sensor.

6. The system of claim 5, wherein the threat condition comprises a gas pressure reading originating from the pressure sensor, a gas temperature reading originating from the temperature sensor, or a tamper detection alarm originating from the tamper detection sensor.

7. The system of claim 5, wherein the gas safety device includes the water level sensor.

8. The system of claim 1, wherein when the server determines the current threat condition to affect another of the plurality of sub-networks, wherein the valve closing instruction signal is also coupled to the gas safety device in the another sub-network during the current threat condition, and wherein the valve closing instruction signal includes a sequence for shutting off the gas safety valves in the first sub-network and in the another sub-network.

9. The system of claim 1, wherein the shut off controller module is configured to shut off the gas safety valve responsive to a sensor reading received from the pressure sensor or from the additional sensor when the sensor reading is determined to be out of specification.

10. A method, comprising:
 a server implementing artificial intelligence (AI) that based on at least one current threat condition to a gas distribution network comprising a plurality of sub-networks including a first sub-network, determining affected ones of the plurality of sub-networks to shut off, wherein the plurality of sub-networks each include a pipe section having a gas safety device coupled to a gas safety valve, and wherein the gas safety device includes a pressure sensor and at least one additional sensor, a shut off controller module configured to shut off the gas safety valve, a computing device comprising a processor and a memory, and a communications module including a transceiver, and wherein the server is communicably coupled to the communications modules of the gas safety devices, the server further implementing a valve failure AI module, wherein
 the valve failure AI module determines a valve failure Risk score for a plurality of gas safety valves of the gas distribution network using inputs from a variety of sources including at least one of:

a history of gas pressure, volume, and/or temperature,
patterns of atmospheric condition,
patterns of gas quality changes, and
valve maintenance records;
the server initiating sending a valve closing instruction signal to the gas safety device in the first sub-network during the current threat condition when the current threat condition is determined to affect the first sub-network, and
in response to the valve closing instruction signal, the shut off controller shutting off the gas safety valve in the first sub-network.

11. The method of claim 10, wherein the server is cloud located, and wherein the communications module further comprises an antenna for wirelessly communicating to the server.

12. The method of claim 10, wherein the server is in a gas distribution utility office of the gas distribution network.

13. The method of claim 10, wherein the additional sensor comprises a temperature sensor, a tamper detection sensor, or a water level sensor.

14. The method of claim 13, wherein the threat condition comprises a gas pressure reading originating from the pressure sensor, a gas temperature reading originating from the temperature sensor, or a tamper detection alarm originating from the tamper detection sensor.

15. The method of claim 10, wherein when the server determines the current threat condition to affect another of the plurality of sub-networks, wherein the valve closing instruction signal is also coupled to the gas safety device in the another sub-network during the current threat condition, and wherein the valve closing instruction signal includes a sequence for shutting off the gas safety valves in the first sub-network and in the another sub-network.

16. The method of claim 10, further comprising the shut off controller module shutting off the gas safety valve responsive to a sensor reading received from the pressure sensor or from the additional sensor when the sensor reading is determined to be out of specification.

\* \* \* \* \*